April 12, 1949.　　　J. A. STEDMAN　　　2,466,916

ATTACHMENT FOR INSIDE MICROMETERS

Filed July 25, 1945

INVENTOR

BY　James A. Stedman

Nathaniel Frucht

ATTORNEY

Patented Apr. 12, 1949

2,466,916

UNITED STATES PATENT OFFICE 2,466,916

ATTACHMENT FOR INSIDE MICROMETERS

James A. Stedman, Cranston, R. I., assignor to Curtis Engineering Company, a corporation of Pennsylvania Application July 25, 1945, Serial No. 606,976

4 Claims. (Cl. 33—167)

The present invention relates to the construction of measuring devices, and has particular reference to an improved construction for an inside caliper.

The principal object of the invention is to provide an arrangement for operating an inside caliper which extends outwardly and exteriorly from the work, whereby the caliper is easily set when measuring relatively inaccessible inside lengths.

Another object of the invention is to provide an inside caliper with an elongated control handle through which the necessary setting is readily accomplished.

A further object is to provide an outside control for an inside caliper, which may be operated to set the caliper for the inside length, and then backed for a measured length to facilitate removal of the caliper from an undercut recess or the like.

Still another object of the invention is to provide an exterior control which may be readily mounted on an inside caliper of standard type.

With the above and other objects and advantageous features in view, the invention consists of a novel arrangement of parts more fully disclosed in the detailed description following, in conjunction with the accompanying drawings which illustrate a preferred embodiment of the invention, and more specifically defined in the claims appended thereto.

It has been found desirable to provide an external control extension for an inside caliper, to more easily insert the caliper into a relatively inaccessible recess, and to permit setting the caliper from the exterior, the parts being so arranged that the caliper may be backed a desired amount so as to facilitate removal from the recess, and may then be reset to the initial measurement. To this end, I provide an elongated control handle containing a rotatable shaft or rod, which is geared to impart turning movement to the upper adjusting head of the caliper, the rotatable rod having a knurled finger engageable end piece which may be provided with a micrometer indicator.

Figure 1:
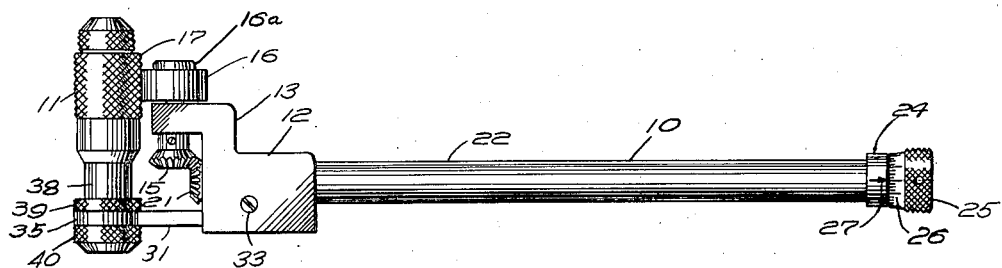
Fig. 1 is a side view of the novel arrangement as applied to a standard inside caliper.
Figure 2:
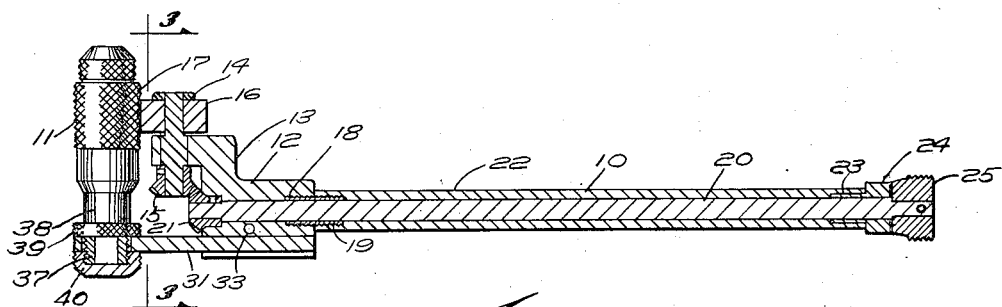
Fig. 2 is a partial central vertical section of Fig. 1, the lower part of the caliper being shown in section.

Referring to the drawings, the invention comprises a control handle mechanism 10 which is detachably secured to an inside caliper 11 of standard type. As shown in Fig. 2, the mechanism 10 includes a base 12 which has an overlying bearing projection 13 in which a vertical shaft 14 is rotatably mounted, a bevel gear 15 being locked to the lower end of the shaft 14, and a friction roller or wheel 16 being keyed to the upper end of the shaft and positioned to rotatively engage the upper knurled adjusting head 17 of the caliper 11, a retaining nut 16a being secured to the upper end of the shaft 14.

Figure 6:
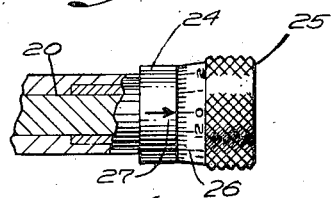
Fig. 6 is an enlarged detail, partly in section, of the outer end of the control handle.

The lower rear end of the base 12 is recessed and threaded, as indicated at 18, to receive a bearing bushing 19, and is longitudinally bored to seat an elongated rod or shaft 20, a bevel gear 21 being secured to the inner end thereof and meshing with the bevel gear 15. A tubular shell 22 is seated over the rod 20 in concentric relation thereto and is interiorly recessed and threaded at its inner end to engage the outer end of the bearing bushing 19, the outer end of the shell 22 being recessed to frictionally receive the outer flange 23 of a hub 24. The rod 20 extends through the hub and has a knurled end grip 25 secured thereto, the end grip 25 having micrometer graduations 26, see Fig. 6, which cooperate with an indicating arrow 27 on the hub 25 to provide indicia for indicating the relative rotation of the parts.

Figure 3:
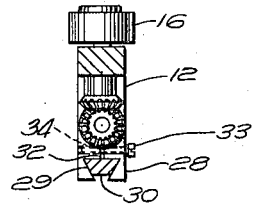
Fig. 3 is a sectional view of Fig. 1 on the line 3—3 of Fig. 2, the friction roller being shown in full lines.
Figure 4:
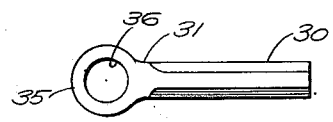
Fig. 4 is a plan view of the lower caliper lock bar.
Figure 5:
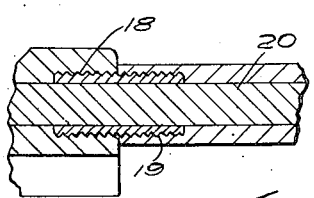
Fig. 5 is an enlarged sectional detail of the inner end of the control handle.

Referring now to Figs. 3 and 4, the lower portion 28 of the base 12 is beveled, as indicated at 29, to receive a correspondingly beveled tongue 30 of a lock bar 31, the lower surface 28 being split as indicated at 32, so that a set screw 33 threaded into a suitable threaded opening 34 may be tightened to securely lock the bar 31 in the base 12. The other end 35 of the bar 31 is bored as indicated at 36, to seat over the threaded cylindrical end 37 of the lower portion 38 of the inside caliper 11, between a knurled threaded washer 39 and a knurled threaded end closure 40 which engage the cylindrical end 37, whereby the parts are securely locked in place to cause rotation of the knurled head 17 upon turning of the knurled end grip 25.

The operation of the novel mechanism may now be explained. The control handle mechanism being attached to an inside caliper, the caliper end may be inserted in a bore or the like for the purpose of measuring the length or diameter of a recess. With the caliper set in the recess the end grip 25 is turned to turn the rod 20 and the gears 21 and 15, whereby the friction wheel 16 turns the caliper head 17. When the measurement is completed, the instrument is removed to read the measurement. If the recess is undercut or if there is surface roughness or difficulty in withdrawing the instrument, the end grip 25 is turned back for an observed number of the graduations 26, whereby the instrument is readily removed; the end grip 25 is then turned forward for the same number of graduations, whereby the position of the inside caliper becomes the same as when in the recess, and the exact measurement may be read.

While I have disclosed a specific constructional embodiment of my invention, it is clear that changes may be made in the size, shape, and arrangement of the parts to accommodate different sizes and shapes of inside calipers and similar extendible devices, without departing from the spirit and the scope of the invention as defined in the appended claims.

I claim:

1. An external control device for an inside caliper having upper and lower contact ends and a rotatable adjusting head, comprising a base having means for receiving the lower contact end, a friction wheel rotatably mounted on the base and adapted to engage the rotatable adjusting head, an elongated extension secured to the base, and means including a manually operable member at the outer end of the extension for rotating the friction wheel.

2. An external control device for an inside caliper having upper and lower contact ends and a rotatable adjusting head, comprising a base having means for receiving the lower contact end, a friction wheel rotatably mounted on the base and adapted to engage the rotatable adjusting head, said lower contact end receiving means being adjustable in the base to provide operating contact between the friction wheel and the rotatable adjusting head, an elongated extension secured to the base, and means at the outer end of the extension for rotating the friction wheel.

3. An external control device for an inside caliper having upper and lower contact ends and a rotatable adjusting head, comprising a base having means for receiving the lower contact end, a friction wheel rotatably mounted on the base and adapted to engage the rotatable adjusting head, a shaft in said base keyed to said friction wheel, an elongated extension secured to the base, a rotatable rod in said extension, gears operatively connecting said rod to said shaft, and means at the outer end of the extension for rotating said rod.

4. An external control device for an inside caliper having upper and lower contact ends and a rotatable adjusting head, comprising a base having means for receiving the lower contact end, a rotatable friction wheel adapted to engage the rotatable adjusting head, a shaft in said base keyed to said friction wheel, an elongated extension secured to the base, a rotatable rod in said extension, gears operatively connecting said rod to said shaft, a fixed hub on the outer end of said extension, and means at the outer end of the extension for rotating said rod, said fixed hub and said means having cooperating indicia for measuring relative rotation.

JAMES A. STEDMAN.

REFERENCES CITED

The following references are of record in the file of this patent:

UNITED STATES PATENTS

| Number | Name | Date |
|---|---|---|
| 347,844 | Usher | Aug. 24, 1886 |
| 1,463,673 | Clase | July 31, 1923 |
| 1,714,009 | Farmer | May 21, 1929 |

FOREIGN PATENTS

| Number | Country | Date |
|---|---|---|
| 405,871 | Great Britain | Feb. 15, 1934 |